(12) United States Patent
Ekkizogloy et al.

(10) Patent No.: US 7,350,986 B2
(45) Date of Patent: Apr. 1, 2008

(54) MICROCODE-DRIVEN PROGRAMMABLE RECEIVE POWER LEVELS IN AN OPTICAL TRANSCEIVER

(75) Inventors: Luke M. Ekkizogloy, San Jose, CA (US); Jayne C. Hahin, Cupertino, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/320,230

(22) Filed: Dec. 28, 2005

(65) Prior Publication Data

US 2006/0147162 A1    Jul. 6, 2006

Related U.S. Application Data

(60) Provisional application No. 60/640,365, filed on Dec. 30, 2004.

(51) Int. Cl.
  *G02B 6/36*  (2006.01)
  *H04B 10/00*  (2006.01)

(52) U.S. Cl. .................... 385/92; 398/135; 398/137

(58) Field of Classification Search ................ 398/137
See application file for complete search history.

(56) References Cited

U.S. PATENT DOCUMENTS 6,285,481 B1 * 9/2001 Palmer ...................... 398/119
6,288,813 B1 * 9/2001 Kirkpatrick et al. ........ 398/136
2003/0095303 A1 * 5/2003 Cunningham et al. ...... 359/110
2003/0223756 A1   12/2003 Tatum et al.
2004/0022537 A1   2/2004 Mecherle et al. ............. 398/41
2004/0033079 A1   2/2004 Sheth et al.
2004/0047635 A1 * 3/2004 Aronson et al. ............. 398/138
2004/0136719 A1   7/2004 Hidai et al.
2004/0136721 A1 * 7/2004 Giaretta et al. ............. 398/135
2005/0017751 A1   1/2005 Gunn et al.
2005/0111845 A1   5/2005 Nelson et al.

* cited by examiner

*Primary Examiner*—Michelle Connelly-Cushwa
*Assistant Examiner*—Chris H. Chu
(74) *Attorney, Agent, or Firm*—Workman Nydegger

(57) ABSTRACT

An operational optical transceiver comprising a receiver, a sensor, a memory, and a processor. The sensor is configured to measure the received power of an optical signal received by the receiver. The received power is sent to the memory where it is read by the processor. The processor is configured by microcode stored in the memory to compare the measured power value with a threshold power value. If the measured power value is below the threshold, then the transceiver will assert an indicator such as a signal indicating this. At a later time, when the measured power level is again above the threshold value, the transceiver will deassert the indicator previously asserted.

20 Claims, 2 Drawing Sheets

MICROCODE-DRIVEN PROGRAMMABLE RECEIVE POWER LEVELS IN AN OPTICAL TRANSCEIVER

CROSS-REFERENCE TO RELATED APPLICATIONS

This application claims the benefit of U.S. Provisional Application No. 60/640,365, filed Dec. 30, 2004, which is incorporated herein by reference in its entirety.

BACKGROUND OF THE INVENTION

1. The Field of the Invention

The present invention relates generally to optical transceivers. More specifically, the present invention relates to determining the level of received optical power in an optical transceiver.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "postamplifier") configured to perform various operations with respect to certain parameters of a data signal received by the optical receiver. A controller circuit (hereinafter referred to the "controller") controls the operation of the laser driver and post amplifier. Therefore what would be advantageous is a controller that controls the level of received power in the optical transceiver.

BRIEF SUMMARY OF THE INVENTION

The forgoing problems with the prior state of the art are overcome by the principles of the present invention, which relate to an optical transceiver configured by microcode to assert or deassert a loss of signal indicator based on the values of the measured receive power. The optical transceiver includes a receiver, a sensor, a system memory, and a microprocessor.

The receiver receives optical signals and converts the signals to electrical signals. The sensor, which is coupled to the receiver, measures the received optical power and makes the measured results available for use by the optical transceiver.

The processors execute microcode held in the memory. The executed microcode causes the optical transceiver to access the measured receive power levels and to access loss of signal threshold values included in the microcode. The optical transceiver then compares the measured received power level and the threshold value. If the measured power level is below the threshold value, then the transceiver will assert an indicator such as a signal indicating this. At a later time, when the measured power level is again above the threshold value, the transceiver will deassert the indicator previously asserted.

Accordingly, the principles of the present invention allow for determination of loss of signal levels using microcode. The microcode controls the process of determining the loss of signal levels. If a user desires a new loss of signal level, the user may simply implement new threshold values in microcode. This removes the need for additional, dedicated hardware for use in determining and changing the desired loss of signal levels.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver comprising a receiver, a sensor, a memory, and a processor. The sensor is configured to measure the received power of an optical signal received by the receiver. The received power is sent to the memory where it is read by the processor. The processor is configured by microcode stored in the memory to compare the measured power value with a threshold power value. If the measured power value is below the threshold, then the transceiver will assert an indicator such as a signal indicating this. At a later time, when the measured power level is again above the threshold value, the transceiver will deassert the indicator previously asserted. An example operational optical transceiver environment will first be described. Then, the operation in accordance with the invention will be described with respect to the operational environment.

Figure 1:
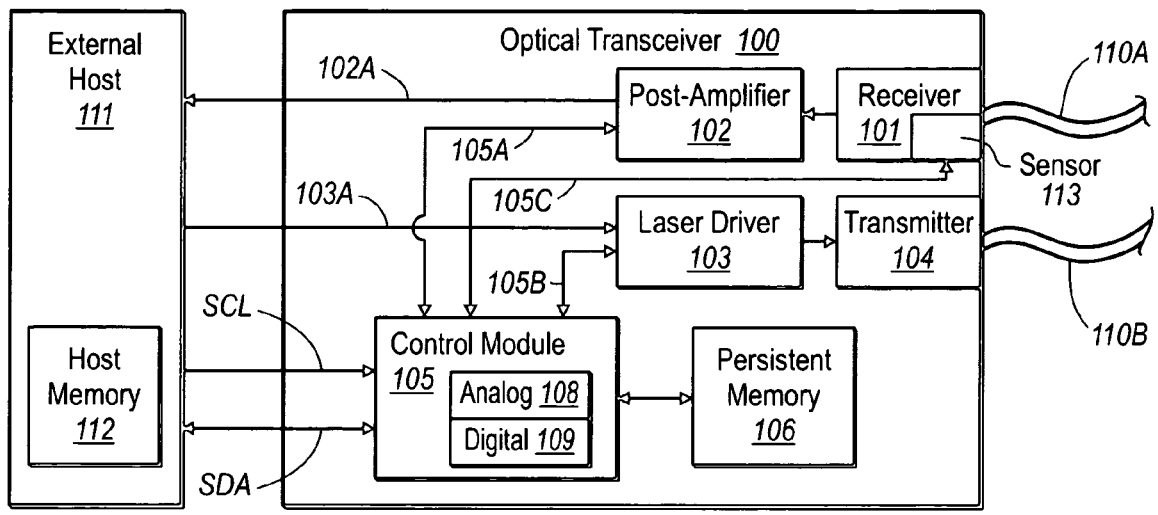
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
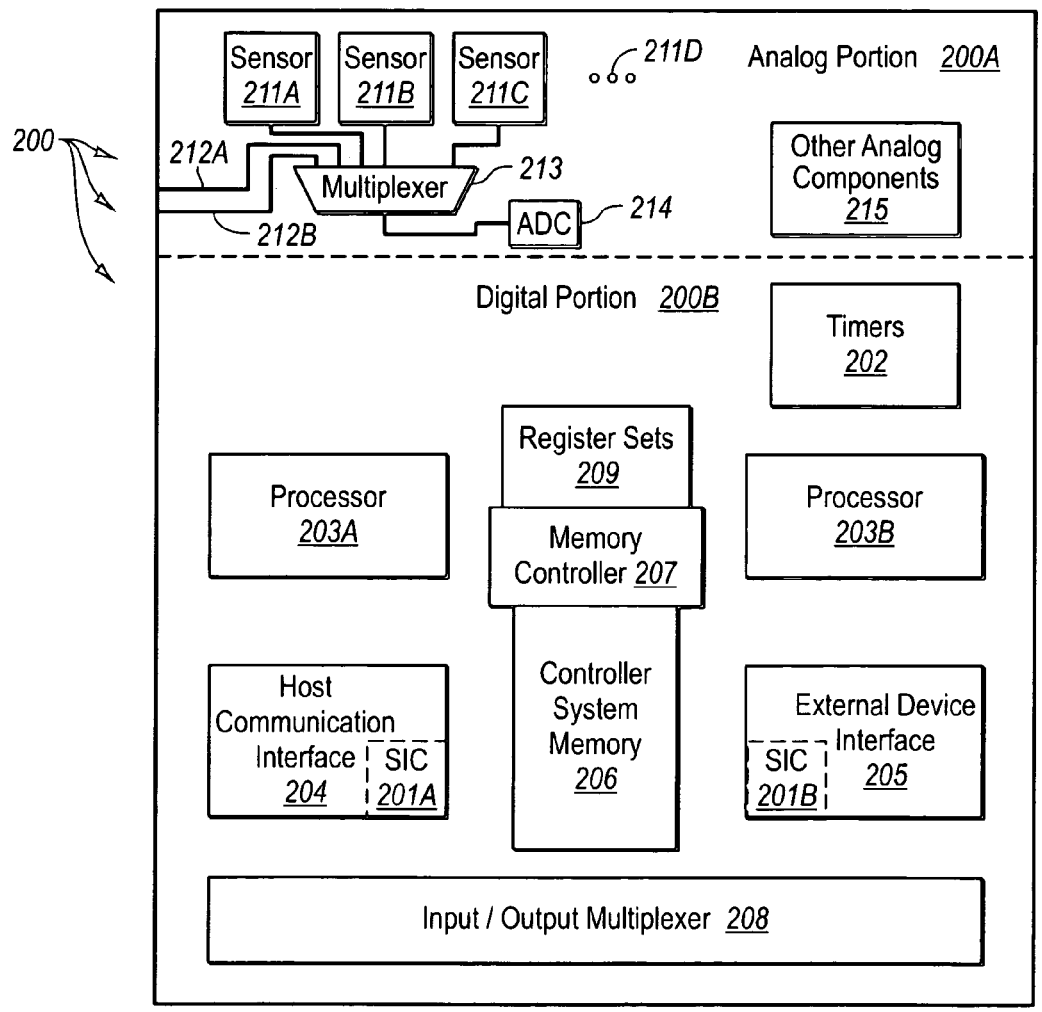
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I$^2$C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I$^2$C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured by microcode to assert or deassert a loss of signal indicator based on the values of the measured receive power. The principles of the present invention will be discussed with reference to the environment described in relation to FIGS. 1 and 2.

Referring again to FIG. 1, an optic sensor 113 is shown coupled with receiver 101. As discussed previously, receiver 101 may receive optical signals and convert them to electrical signals. Sensor 113, which may be a photo-diode or other sensor capable of measuring optical power, measures the receive power level of the optical signals received by receiver 101.

Sensor 113 transmits the measured optical receive power levels of receiver 101 to control module 105 using connection 105C. Connection 105C may correspond to external signal lines 212A and 212B as seen in FIG. 2 and as briefly mentioned above. The measured optical power levels may then be propagated through multiplexer 213 to ADC 214 for digital conversion. Each measured optical receive power level may then be written to a register found in register sets 209 or written directly into controller system memory 206 for further processing.

The optical transceiver 100 may be supplied with loss of signal microcode. The loss of signal microcode may contain a lookup table of desired loss of signal threshold values. In the description and in the claims, "loss of signal" is defined to mean a received optical power level that is less than a desired optical receive power level. This definition includes what is known in the art as Loss of Signal (LOS) levels and Signal Detect levels. The desired loss of signal threshold values correspond to acceptable loss of signal assert and deassert levels (i.e., the lowest acceptable receive optical power) as determined by a user or the optical transceiver manufacturer. If at a later time the loss of signal level changes, new loss of signal microcode containing new loss of signal threshold values may be provided by the user or the optical transceiver manufacturer.

The loss of signal threshold values act as assert and deassert power levels for a loss of signal indicator. The loss of signal indicator may be a loss of signal signal or any other means of indicating a loss of signal. If a measured power level is less than the threshold value, then a loss of signal indicator is asserted. Conversely, if a measured power level is more than the threshold value, then a loss of signal indicator is deasserted if the loss of signal indicator was previously asserted.

In many embodiments, the loss of signal threshold values are indicated as an assert loss of signal threshold value and a deassert loss of signal threshold value. The deassert threshold value will typically be a slightly higher value than the assert threshold value. Having the two threshold values helps to stabilize the measurements at the boundary of the assert and deassert threshold levels. If there were only one loss of signal threshold value, then the loss of signal indicator may be asserted and deasserted in a manner that would lead to unreliable results.

The loss of signal microcode may be loaded into controller system memory 206 from persistent memory 106 prior to execution. For example, if the system memory were small, the loss of signal microcode may be loaded one portion at a time for execution. Alternatively, if the system memory was larger (e.g., a RAM), then all of the loss of signal microcode may be loaded into controller system memory 206 prior to execution. The microcode may also have been placed in the controller system memory 206 and/or the persistent memory 106 by the host 111 using the serial data line SDA or other implemented host communication interface. In some embodiments, the loss of signal microcode may be loaded directly from host memory 112 or some other persistent memory that is accessible to optical transceiver 100, such as a remote computing system coupled to optical transceiver 100 by the internet or other wide area network.

In some embodiments, both the assert and deassert loss of signal values may be written to a register in register sets 209. These values may then be accessed by the processors 203 when determining loss of signal level. In still other embodiments, a user may access host 111 and write desired assert and deassert signal levels into a register or memory of transceiver 100. These values may then be accessed by the processors 203 when determining the loss of signal levels.

Figure 3:
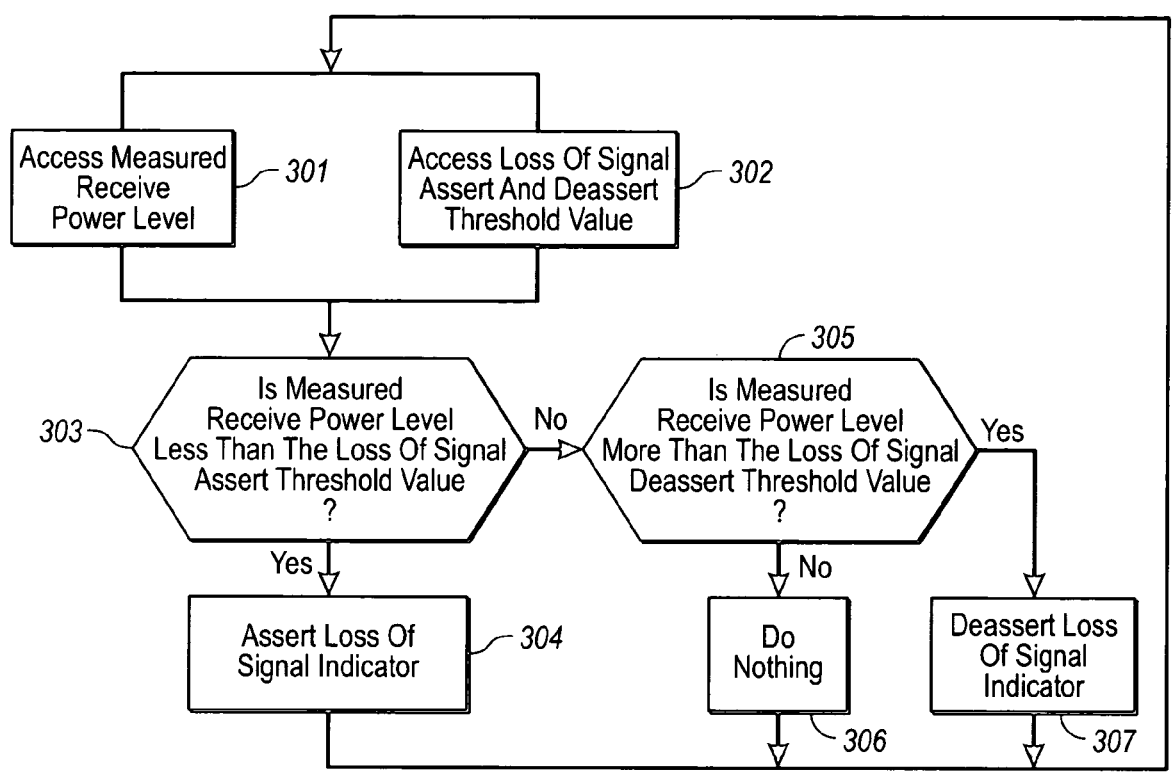
FIG. 3 illustrates a flowchart of a method for the optical transceiver to determine the level of loss of signal level according to the principles of the present invention.

Referring to FIG. 3, a flowchart of a method 300 for an optical transceiver to determine the loss of signal level is illustrated with reference to the environment described with respect to FIGS. 1 and 2. The executed loss of signal microcode directs processor 203A and/or 203B to access the measured optical receive power levels (act 301). As mentioned previously, these levels are measured by a sensor 113 and provided to a register in register sets 209 or to controller system memory 206. The processors 203 also access the loss of signal threshold assert and deassert values found in the executed loss of signal microcode (act 302).

Processors 203 then compare the actual measured receive power level with the loss of signal assert threshold value (decision block 303). If the measured received optical power is less than the assert loss of signal threshold value (YES in decision block 303), then processors 203 cause that a loss of signal indicator be asserted (act 304). In some embodiments, the processors 203 may send a signal directly to host 111 over the implemented host interface informing the host 111 that receive power is low. In other embodiments, the processors 203 may write a flag to a register in register sets 209. Host 111 may then poll the register and discover that the loss of signal has been asserted and that the receive power is low. In both cases, informing host 111 of the asserted loss of signal allows for user analysis. Transceiver 100 may continue to assert the loss of signal indicator until the measured receive power is more than the loss of signal threshold value.

If, on the other hand, the measured receive power is more than the assert loss of signal threshold value (NO in decision block 303), processors 203 then compare the actual measured receive power level with the loss of signal deassert threshold value (decision block 305). If the measured received optical power is less than the deassert loss of signal threshold value (NO in decision block 305), then the system will do nothing in relation to asserting or deasserting the loss of signal indicator (act 306). For example, if the transceiver is receiving a desired power, then there will be no need to assert or deassert the loss of signal indicator. Alternatively, the loss of signal indicator will remain asserted if it was previously asserted or deasserted if it were previously deasserted.

If the measured power level is greater than the loss of signal deassert threshold (YES in decision block 305), processors 203 will cause that the loss of signal indicator signal be deasserted (act 307). In some embodiments, the processors 203 may cease to send a signal to host 111. In other embodiments, the processors 203 may turn off a flag written to a register in register sets 209. Transceiver 100 may remain in the deassert state until the receive power once again falls below the assert threshold value. At that time, the processors 203 will assert the loss of signal indicator as discussed above.

A specific example of the present invention will now be described. Suppose that the loss of signal microcode included a loss of assert signal threshold value of 100 mW and a deassert threshold value of 110 mW. Suppose further that sensor 113 during a first measurement measured the receiver 101 receive optical power to be 90 mW. Sensor 113 would send an analog representation of this value over line 105C to control module 105. The analog signal would propagate through multiplexer 213 and be converted to a digital signal by ADC 214. The digital value would then be stored in a register in register sets 209.

Processors 203 would then execute the loaded loss of signal microcode. Alternatively, the processors may access the registers with the assert and deassert values. The execution of the microcode would cause either processor 203A or 203B to access the measured 90 mW values in register sets 209 and compare that with the loss of signal assert threshold value of 100 mW. Since the measured receive power value was less than the assert threshold value, the processors 203 would assert a loss of signal indicator by sending the signal to host 111 over the SDA line.

At a later time, suppose the receive power became 120 mW. Sensor 113 would send an analog representation of this value over line 105C to control module 105. The analog signal would propagate through multiplexer 213 and converted to a digital signal by ADC 214. The digital value would then be stored in a register in register sets 209.

Processors 203A or 203B would access the measured 120 mW values in register sets 209 and compare that with the loss of signal threshold value of 100 mW. Since the measured receive power value was more than the threshold value, the processors 203 would then compare this measured power with the deassert threshold value. Since the measured power was more than the deassert threshold value, the loss of signal indicator would be deasserted. Processors 203 would cease to send the signal to host 111.

Accordingly, the principles of the present invention relate to an optical transceiver that is configured by microcode to assert or deassert a loss of signal indicator based on the level of the measured receive power. The user determines the appropriate loss of signal level and incorporates this into microcode. The executed microcode causes the optical transceiver to assert or deassert the loss of signal indicator and perhaps to communicate this to the host. This removes the need for additional hardware to assert or deassert a loss of signal indicator. Accordingly, the principles of the present invention are a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver comprising the following:
    a receiver configured to receive optical signals and convert the optical signals to electric signals;
    a sensor that is optically coupled to the receiver, the sensor being capable of measuring the receive power level of a received optical signal;
    a memory holding replaceable microcode that comprises:
        executable instructions concerning loss of signal (LOS) assert and deassert power levels; and
        loss of signal assert and deassert power level information; and at least one microprocessor configured to cause the optical transceiver to perform the following as a result of executing the microcode:
an act of accessing a measured receive power level;
an act of accessing a loss of signal assert power level;
an act of comparing the measured receive power level to the loss of signal assert power level; and
an act of causing a loss of signal indicator to be asserted if:
the measured receive power level is less than the loss of signal assert power level; and
the loss of signal indicator is not already asserted in connection with the measured receive power level.

2. An optical transceiver in accordance with claim 1, wherein the sensor is a photo-diode.

3. An optical transceiver in accordance with claim 1, wherein the microcode in the memory includes a lookup table containing loss of signal assert power levels.

4. An optical transceiver in accordance with claim 1, wherein the loss of signal indicator to be asserted or deasserted is one of an electric signal generated by the optical transceiver and a flag written in the memory by the optical transceiver.

5. An optical transceiver in accordance with claim 1, wherein the optical transceiver is one of a 1 G transceiver, a 2 G transceiver, a 4 G transceiver, a 8 G transceiver, or a 10 G transceiver.

6. An optical transceiver in accordance with claim 1, wherein the optical transceiver is a transceiver suitable for fiber optic links operating at data rates greater than 10 G.

7. An optical transceiver in accordance with claim 1, wherein the optical transceiver is one of a XFP transceiver, a SFP transceiver, or a SFF transceiver.

8. An optical transceiver in accordance with claim 1, wherein the at least one microprocessor is further configured to cause the optical transceiver to perform the following as a result of executing the microcode:
an act of accessing a loss of signal deassert power level;
an act of comparing the measured receive power level to the loss of signal deassert power level; and
an act of causing the loss of signal indicator to be deasserted if:
the measured receive power is more than the loss of signal deassert power level; and
the loss of signal deassert has not already been implemented in connection with the measured receive power level.

9. An optical transceiver in accordance with claim 8, wherein the microcode in the memory includes a lookup table containing loss of signal deassert power levels.

10. An optical transceiver in accordance with claim 8, wherein the loss of signal indicator to be deasserted is one of an electric signal generated by the optical transceiver and a flag written in the memory by the optical transceiver.

11. An optical transceiver in accordance with claim 8, wherein the loss of signal assert power level and the loss of signal deassert power level are separate and distinct values.

12. An optical transceiver in accordance with claim 1, further comprising an optical fiber interface by way of which the receiver is able to receive the optical signals.

13. An optical transceiver, comprising:
an optical fiber interface;
a receiver configured to receive optical signals by way of the optical fiber interface and convert the received optical signals to electric signals; and
a control module coupled to the receiver, the control module being programmed to assert or deassert an LOS indicator in response to the occurrence of predetermined conditions, and the control module comprising:
a sensor optically coupled to the receiver and configured to measure the power level of a received optical signal, the sensor being in communication with the control module;
a memory holding replaceable microcode that comprises:
executable instructions concerning LOS assert and deassert power levels; and
LOS assert and deassert power level information; and
a processor coupled to the memory and programmed to determine:
whether or not an LOS indicator should be asserted; and
whether or not the LOS indicator should be deasserted.

14. An optical transceiver in accordance with claim 13, wherein the sensor is a photo-diode.

15. An optical transceiver in accordance with claim 13, wherein the optical transceiver is one of a 1 G transceiver, a 2 G transceiver, a 4 G transceiver, a 8 G transceiver, or a 10 G transceiver.

16. An optical transceiver in accordance with claim 13, wherein the optical transceiver is a transceiver suitable for fiber optic links operating at data rates greater than 10 G.

17. An optical transceiver in accordance with claim 13, wherein the optical transceiver is one of a XFP transceiver, a SFP transceiver, or a SFF transceiver.

18. The optical transceiver as recited in claim 13, wherein the LOS indicator comprises one of: an LOS signal; and a written flag.

19. The optical transceiver as recited in claim 13, wherein the processor is programmed to:
access a measured receive power level;
access a loss of signal assert power level;
compare the measured receive power level to the loss of signal assert power level; and
assert a loss of signal indicator if:
the measured receive power level is less than the loss of signal assert power level; and
the loss of signal indicator is not already asserted in connection with the measured receive power level.

20. A transceiver comprising:
a first optical fiber interface;
an optical transmitter configured to transmit an optical data signal from the transceiver by way of the first optical fiber interface;
a second optical fiber interface;
a receiver configured to receive an optical data signal by way of the second optical fiber interface, and to convert the received optical data signal to an electrical data signal;
a sensor that is optically coupled to the receiver, the sensor being capable of measuring the optical power level of a received optical data signal; and
a control module in at least indirect communication with the sensor, the optical transmitter and the optical receiver, and the control module comprising:
a processor;
a memory; and
a host communication interface in at least indirect communication with the memory, and
the control module holding replaceable microcode that, when executed by the processor, causes the control module to perform the following acts:

accessing a measured optical power level of a received optical data signal;

accessing a loss of signal (LOS) assert power level;

comparing the measured optical power level of the received optical data signal to the loss of signal (LOS) assert power level; and causing a loss of signal (LOS) indicator to be asserted and transmitted to a host device by way of the host communication interface, if:

the measured optical power level of the received optical data signal is less than the loss of signal (LOS) assert power level; and the loss of signal (LOS) indicator is not already asserted in connection with the measured optical power level of the received optical data signal.

* * * * *

UNITED STATES PATENT AND TRADEMARK OFFICE
CERTIFICATE OF CORRECTION

| | |
|---|---|
| PATENT NO. | : 7,350,986 B2 |
| APPLICATION NO. | : 11/320230 |
| DATED | : April 1, 2008 |
| INVENTOR(S) | : Ekkizogloy et al. |

Page 1 of 1

It is certified that error appears in the above-identified patent and that said Letters Patent is hereby corrected as shown below:

IN THE SPECIFICATIONS:

<u>Column 1</u>
Line 61, change "forgoing" to --foregoing--

Signed and Sealed this

Second Day of November, 2010

David J. Kappos
*Director of the United States Patent and Trademark Office*